United States Patent
Ferguson-Jarnes et al.

(10) Patent No.: US 9,264,905 B2
(45) Date of Patent: Feb. 16, 2016

(54) ESTABLISHING SECURE CONNECTION BETWEEN MOBILE COMPUTING DEVICE AND WIRELESS HUB USING SECURITY CREDENTIALS OBTAINED FROM REMOTE SECURITY CREDENTIAL SERVER

(71) Applicant: Digi International Inc., Minnetonka, MN (US)

(72) Inventors: Bradley S. Ferguson-Jarnes, Minneapolis, MN (US); Nathaniel D. Herman, Chanhassen, MN (US)

(73) Assignee: Digi International Inc., Minnetonka, MN (US)

( * ) Notice: Subject to any disclaimer, the term of this patent is extended or adjusted under 35 U.S.C. 154(b) by 290 days.

(21) Appl. No.: 13/772,805

(22) Filed: Feb. 21, 2013

(65) Prior Publication Data

US 2014/0233545 A1    Aug. 21, 2014

(51) Int. Cl.
*H04W 12/08* (2009.01)
*H04W 12/06* (2009.01)
*H04W 4/00* (2009.01)

(52) U.S. Cl.
CPC .............. *H04W 12/08* (2013.01); *H04W 12/06* (2013.01); *H04W 4/008* (2013.01)

(58) Field of Classification Search
CPC . G06K 7/0008; G06K 7/016; G06K 7/10821; G06K 7/1404; G07F 17/32; G07F 17/3234; H03M 7/42; H03M 7/48; H04L 12/2809; H04W 12/06; H04W 48/14; H04W 48/20; H04W 76/02; H04W 88/08; H04W 8/26; H04W 8/08; H04W 4/008
USPC ............................ 370/254–350; 709/201–213
See application file for complete search history.

(56) References Cited

U.S. PATENT DOCUMENTS

| | | |
|---|---|---|
| 6,310,538 B1 | 10/2001 | Boucher |
| 7,356,389 B2 | 4/2008 | Holst et al. |
| 7,401,741 B2 | 7/2008 | Thayer |
| 7,762,470 B2 | 7/2010 | Finn et al. |
| 7,784,707 B2 | 8/2010 | Witty et al. |
| 7,802,729 B2 | 9/2010 | Thayer |

(Continued)

OTHER PUBLICATIONS

Alpar et al., "Using NFC Phones for Proving Credentials", Jan. 9, 2012, pp. 1-14.

(Continued)

*Primary Examiner* — Ayaz Sheikh
*Assistant Examiner* — Debebe Asefa
(74) *Attorney, Agent, or Firm* — Fogg & Powers LLC (57) ABSTRACT

A mobile computing device includes a first wireless local area network adapter; a wireless wide area network adapter configured to connect to a remote security credential server across a wireless wide area network; an optical scanner or a near field radio communication adapter. The mobile computing device is configured to obtain information regarding security credentials from at least one of an optical scan of an optical tag and a near field radio communication exchange with a near field radio communication tag; obtain the security credentials from the remote security credential server across the wireless wide area network by providing the information regarding the security credentials to the remote security credential server which responds with the security credentials; and use the security credentials to establish a secure wireless network connection between the first wireless local area network adapter and a second wireless local area network adapter of a wireless hub.

30 Claims, 7 Drawing Sheets

(56) References Cited

U.S. PATENT DOCUMENTS

| | | | |
|---|---|---|---|
| 7,881,838 | B2 | 2/2011 | Larschan et al. |
| 8,000,314 | B2 | 8/2011 | Brownrigg et al. |
| 8,013,732 | B2 | 9/2011 | Petite et al. |
| 8,045,961 | B2 | 10/2011 | Ayed et al. |
| 8,064,412 | B2 | 11/2011 | Petite |
| 8,112,066 | B2 | 2/2012 | Ben Ayed |
| 8,212,667 | B2 | 7/2012 | Petite et al. |
| 8,215,546 | B2 | 7/2012 | Lin et al. |
| 8,233,841 | B2 | 7/2012 | Griffin et al. |
| 8,244,179 | B2 | 8/2012 | Dua |
| 8,260,262 | B2 | 9/2012 | Ben Ayed |
| 8,279,067 | B2 | 10/2012 | Berger et al. |
| 8,280,359 | B2 | 10/2012 | Moshir et al. |
| 8,290,877 | B2 | 10/2012 | Herwig et al. |
| 8,627,420 | B2 * | 1/2014 | Furlan et al. ............... 726/5 |
| 8,665,753 | B2 * | 3/2014 | Averbuch et al. ............ 370/254 |
| 2002/0197979 | A1 | 12/2002 | Vanderveen |
| 2003/0017822 | A1 | 1/2003 | Kissner et al. |
| 2004/0142710 | A1 | 7/2004 | Liang |
| 2004/0166857 | A1 | 8/2004 | Shim et al. |
| 2005/0197748 | A1 | 9/2005 | Holst et al. |
| 2010/0063670 | A1 | 3/2010 | Brzezinski et al. |
| 2010/0100310 | A1 | 4/2010 | Eich et al. |
| 2012/0252405 | A1 | 10/2012 | Lortz et al. |
| 2012/0254959 | A1 | 10/2012 | Schmidt et al. |

OTHER PUBLICATIONS

"Fleet Management: Wirelessly Track, Monitor, and Enable Your Fleet", "at least as early as Oct. 2012", pp. 1-2, Publisher: AT&T.
Clark, "NFC Task Launcher Expands potential Uses of Android Tag Reading Applications", Mar. 30, 2011, pp. 1-3, Publisher: www.nfcworld.com.
Colin et al., "Fleet Telematics Becoming a 'Must-Have'", Feb. 2007, pp. 1-6, Publisher: www.automotive-fleet.com.
Constantinescu, "NFC Task Launcher Makes Near Field Even More Useful [Android App]", Mar. 31, 2011, pp. 1-3, Publisher: www.intomobile.com.
Cowgill, "Developing Mobile Applications That Support Near Field Communications (NFC)", "at least as early as Dec. 2011", 2011, pp. 1-4, Publisher: wiki.developerforce.com.
Coxworth, "Car Connectivity Consortium Set to Unveil its First MirrorLink Products", Sep. 13, 2011, pp. 1-3, Publisher: www.gizmag.com.
Cozma, "InstaWifi for Android shares Wi-Fi access via NFC or QR code", Jul. 27, 2012, pp. 1-4, Publisher: CNET.
Crider, "WiFi QR Share LEts Visitors Scan to Access Your Home LAN", Dec. 22, 2011, pp. 1-3, Publisher: androidcommunity.com.
"Digi Transportation/ Fleet Soluctions", "at least as early as Dec. 2010", 2010, pp. 1-2, Publisher: Digi International Inc.
"Vehicle to Vehicle Wireless Communication using WiFi & NFC", "at least as early as Oct. 2012", pp. 1-3, Publisher: www.electronicsbus.com.
Epstein, "New Android API Eliminates Bluetooth Pairing Using NFC", Feb. 19, 2011, pp. 1-3, Publisher: www.bgr.com.
"Ford Edge Forum: What's the Point of the WiFi Connection?", Nov. 2010, pp. 1-4, Publisher: www.fordedgeforum.com.
"Ford: SYNC In-Car WiFi", Aug. 2011, p. 1 Publisher: media.ford.com.
"Ford SYNC Goes WiFi Turning Car Into Mobile Internet Hot Spot for Passengers While on the Go", Dec. 21, 2009, pp. 1-2.
"Ford SYNC Connects Car With Internet: New WiFi Reciever, Built-In Web Browser, Mobile Hotspot", Jan. 7, 2010, pp. 1-2.
"Using Wireless Technology to Manage and Optimize Government Fleets", Jul. 12, 2011, pp. 1-12, Publisher: www.frost.com.
Nguyen, "Will NFC Simplify WiFi Logins at Local Cafes?", Apr. 1, 2011, p. 1 Publisher: www.gottabemobile.com.
Healey, "MirrorLink Tries to Ensure Phones, Apps and Cars Play Together", Oct. 2, 2011, pp. 1-3, Publisher: usatoday.com.
Hughes-White, "Fleet Efficiency in a Wireless World", Jun. 14, 2011, pp. 1-4, Publisher: www.inmotiontechnology.com.
Chen, "Introducing InstaWifi", at least as early as Jun. 2012, p. 1 Publisher: www.instawifi.jessechen.net.
"The Connected Car", Oct. 24, 2011, pp. 1-6, Publisher: Jungo Connectivity Software.
"Automotive Connectivity Middleware", "at least as early as Oct. 2012", pp. 1-4, Publisher: www.jungo.com.
Kellex, "InsaWifi Makes Joining WiFi Networks Easy With NFC or QR Codes", Jul. 24, 2012, pp. 1-3, Publisher: www.droid-life.com.
Khan, "Connect to WiFi Networks by Scanning QR Codes with Barcode Scanner [Android]", Aug. 24, 2011, pp. 1-2, Publisher: addictivetips.com.
Lightner, "How to Share Your Wi-Fi Access with a QR Code", Jul. 8, 2011, pp. 1-5, Publisher: howto.CNET.com.
"LTE Powers New Possibilities in Transportation and Fleet Management", at least as early as Aug. 2012, pp. 1-2, Publisher: www.connectedworldmag.com.
"Fleet Management for Transportation and Logistics", at least as early as Oct. 2012, pp. 1-2, Publisher: Motorola Solutions USA.
"GPS Fleet Management", "at least as early as Dec. 2011", pp. 1-2, Publisher: www.movilizer.com.
"New Car Connectivity Consotium Aims to Put In-Vehicle infotainment Into High Gear", Mar. 17, 2011, pp. 1-4, Publisher: www.symbian-freak.com.
Newcomb, "A Better Way Than Bluetooth", Aug. 25, 2010, pp. 1-6, Publisher: www.edmunds.com.
"Bluetooth Secure Simple Pairing Using NFC", Oct. 18, 2011, Publisher: NFC Forum, TM.
"Nokia car Mode Drives Fusion of Cars with Smartphone Services", Sep. 13, 2011, pp. 1-2, Publisher: press.nokia.com.
Pinola, "How to Share your Wi-Fi Network with Android users, No Password Typing Required", Aug. 30, 2011, pp. 1-2, Publisher: lifehacker.com.
"Qualcomm's Services Portal Now Integrated with TMWSuite, Offering Seamless Access to Tethered and untethered Trailer Tracking Data", Sep. 23, 2012, pp. 1-4, Publisher: www.qualcomm.com.
Sa, "Access Control with Mobile Phones: the Future with Near Field Communications", "at least as early as Oct. 2012", pp. 1-2, Publisher: www.sourcesecurity.com.
"Transportation", "at least as early as Oct. 2012", Publisher: www.sierrawireless.com.
"WiFi Credentials in a QR Code", Jan. 21, 2011, p. 1 Publisher: slacy.com.
Summerson, "[New App] InstaWiFi Lets you Easily Share Your Wi-Fi Password Through NFC or QR Codes", Jul. 27, 2012, pp. 1-2, Publisher: androidpolice.com.
"Toyota introduces World-First MirrorLink Based In-Car Infotainment Product for Smartphones", Oct. 26, 2011, pp. 1-4, Publisher: www.symbian-freak.com.
Wieder, "QR Code for your Wifi Network", Aug. 2011, pp. 1-2, Publisher: Intelligent e-Commerce, Inc.
"WiFi Barcode Scanner", "at least as early as Oct. 2012", pp. 1-2, Publisher: play.google.com.
"Eight New Smartphones and Tablets Certified for Xata Turnpike", May 8, 2012, pp. 1-2, Publisher: XRS Corporation.
"Developing In-Vehicle Infotainment Systems", Dec. 8, 2011, pp. 1-6, Publisher: www.bsquare.com.

* cited by examiner

ESTABLISHING SECURE CONNECTION BETWEEN MOBILE COMPUTING DEVICE AND WIRELESS HUB USING SECURITY CREDENTIALS OBTAINED FROM REMOTE SECURITY CREDENTIAL SERVER

BACKGROUND

Wireless vehicle adapters provide wireless access to vehicles' computing systems from an external device, such as a mobile computing device. Wireless security credentials may be manually input to establish a secure wireless network connection between the mobile computing device and the wireless vehicle adapter. Mistakes are easily made during this manual input process, which leads to errors logging in and wasted time. There is a need for improved ways to connect in these scenarios.

SUMMARY

A mobile computing device includes a first wireless local area network adapter; a wireless wide area network adapter configured to connect to a remote security credential server across a wireless wide area network; and at least one of an optical scanner and a near field radio communication adapter. The mobile computing device is configured to obtain information regarding security credentials from at least one of an optical scan of an optical tag and a near field radio communication exchange with a near field radio communication tag; obtain the security credentials from the remote security credential server across the wireless wide area network by providing the information regarding the security credentials to the remote security credential server which responds with the security credentials; and use the security credentials to establish a secure wireless network connection between the first wireless local area network adapter of the mobile computing device and a second wireless local area network adapter of a wireless hub.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below enable simpler secure establishment of a secure wireless network connection between a wireless local area network adapter of a mobile computing device and a wireless local area network adapter of a wireless hub. An exemplary system is configured to obtain information regarding security credentials from either an optical scan of an optical tag or a near field radio communication exchange with a near field radio communication tag. The exemplary system obtains the security credentials from a remote security credential server across a wireless wide area network by providing information regarding the security credentials to the remote security credential server which responds with the security credentials. The mobile computing device then uses the security credentials to establish a secure wireless network connection between the first wireless local area network adapter of the mobile computing device and the second wireless local area network adapter of the wireless hub.

Figure 1:
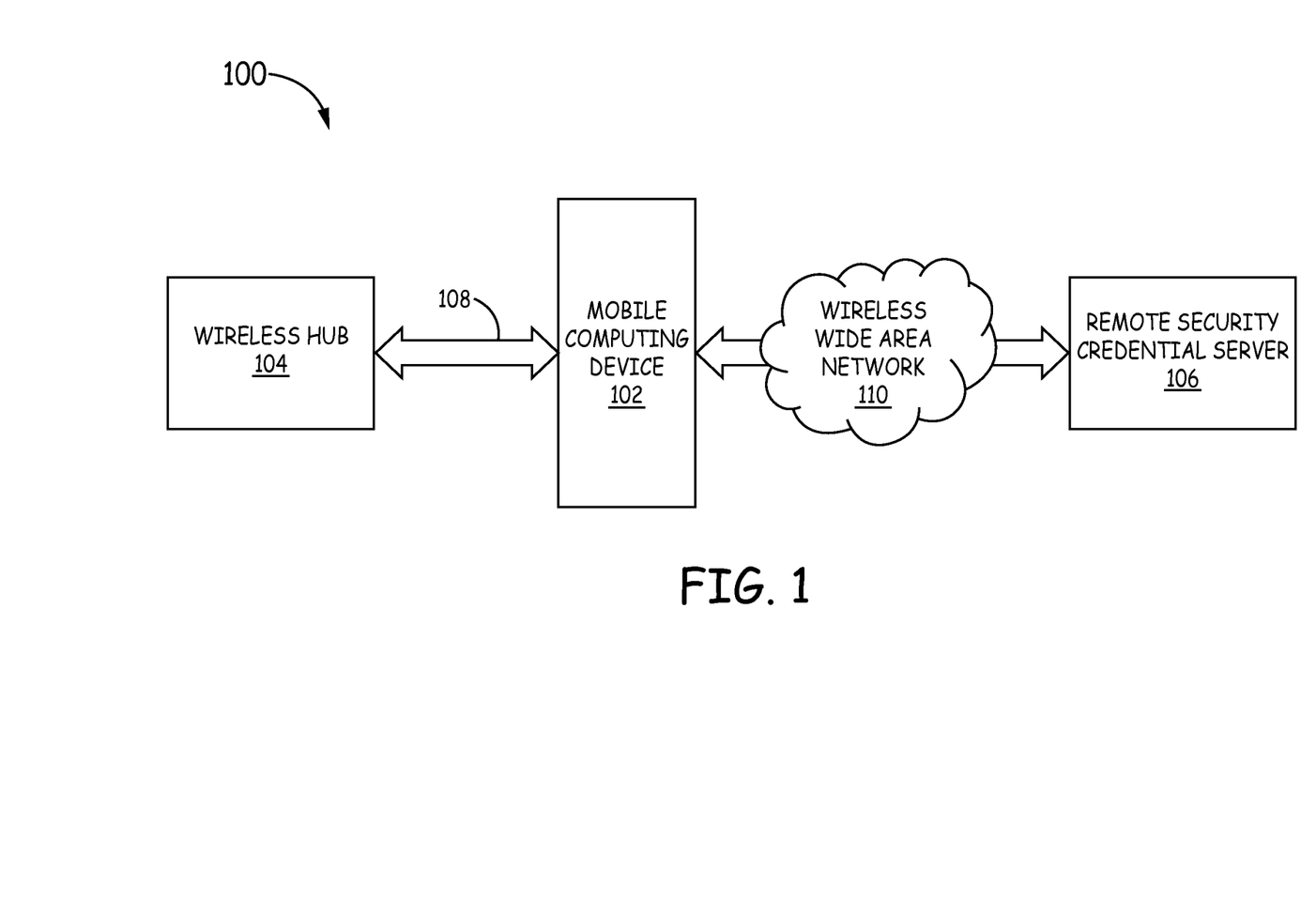
FIG. 1 is a block diagram depicting an exemplary embodiment of a system according to the present disclosure.

FIG. 1 is a block diagram depicting an exemplary embodiment of a system 100 according to the present disclosure. System 100 includes a mobile computing device 102, a wireless hub 104, and a remote security credential server 106. The mobile computing device 102 and the wireless hub 104 are configured to be communicatively coupled across a wireless local area network 108. In contrast, the mobile computing device 102 and the remote security credential sever 106 are configured to be communicatively coupled via a wireless wide area network 110.

The mobile computing device 102 can be any mobile computing device that can communicate with both the wireless local area network 108 and the wireless wide area network 110. In exemplary embodiments, the mobile computing device is a mobile phone (including smart phones and features phones), a tablet computer, a laptop computer, a personal data assistant, or an application device. Applicable devices are not limited by system architecture, hardware manufacturer, or operating system. Example embodiments of the mobile computing device 102 will be described in further detail below.

In exemplary embodiments, the wireless hub 104 is a wireless vehicle adapter integrated onboard a vehicle, such as a ground vehicle, water vehicle, air vehicle, or space vehicle. In exemplary implementations, the wireless hub 104 is a wireless vehicle adapter onboard a manned vehicle. In exemplary implementations, the wireless hub 104 is a wireless vehicle adapter onboard an autonomous vehicle. In exemplary implementations, the wireless hub 104 is configured to provide diagnostic information, maintenance information, usage information, and/or logistics information regarding the vehicle to the mobile computing device 102 via the wireless local area network 108 and/or another computing device via the wireless local area network 108 and the wide are network 110. In exemplary embodiments, diagnostic information and maintenance information may include operational parameters and/or measurements of various components of the vehicle. In exemplary embodiments, usage information may include information regarding braking, acceleration, seatbelt usage, velocity, direction, etc. In exemplary embodiments, logistics information may include information relating to the behavior or location of the vehicle.

In other exemplary embodiments, the wireless hub 104 is integrated into at least one of a structure, a container, a pallet, a box, a pipe, a trailer, a vehicle attachment, or other shipping conveyance. In exemplary implementations, the wireless hub 104 is further configured to provide information regarding the environmental characteristics or contents of the structure, the container, the pallet, the box, the pipe, the trailer, the vehicle attachment, or the other shipping conveyance to the mobile computing device 102 via the wireless local area network 108 and/or another computing device via the wireless local area network 108 and the wide are network 110.

In exemplary embodiments, the wireless local area network 108 implements one of the IEEE 802.11 (Wi-Fi) standards, such as 802.11a, 802.11b, 802.11g, 802.11n, 802.11ac, and 802.11 ad. In exemplary embodiments, the wireless local area network 108 uses Internet Protocol (IP) packets for data communication. In other embodiments, the wireless local area network 108 implements other standards and protocols, such as but not limited to Bluetooth.

The remote security credential server 106 stores security credentials used to establish a secure wireless connection between the mobile computing device 102 and the wireless hub 104 using the wireless local area network 108. In exemplary embodiments, the remote security credential server 106 provides security credentials to the mobile computing device 102 in response to information regarding the security credentials being provided to the remote security credential server 106 by the mobile computing device 102. This will be described in more detail below.

In exemplary embodiments, the wireless wide area network 110 is a cellular data service network implementing a cellular data service network using any applicable technology or infrastructure, such as but not limited to GSM, CDMA, GPRS, W-CDMA, EDGE, CDMA2000, WiMAX, and LTE. In exemplary implementations, the communication between the mobile computing device 102 and the remote security credential server 106 is secured while being transmitted across the wireless wide area network 110. In exemplary implementations, this communication is secured using encryption and/or virtual private network (VPN) tunneling.

Figure 2A:
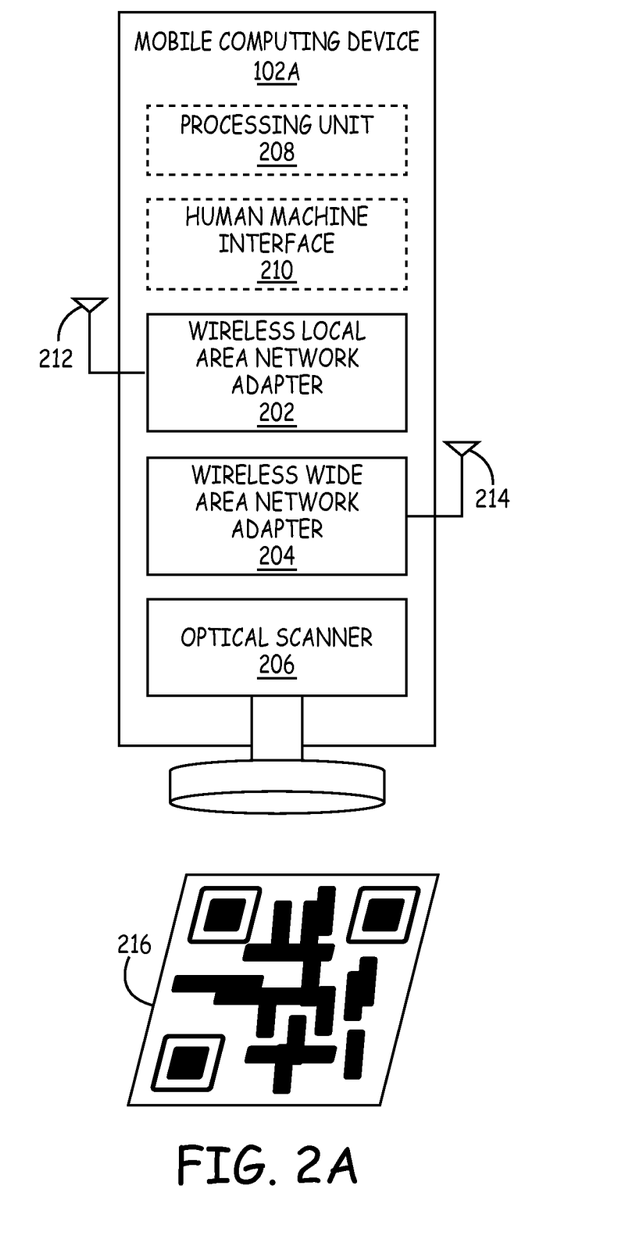
FIGS. 2A-2B are block diagrams depicting exemplary embodiments of mobile computing devices according to the present disclosure.
Figure 2B:
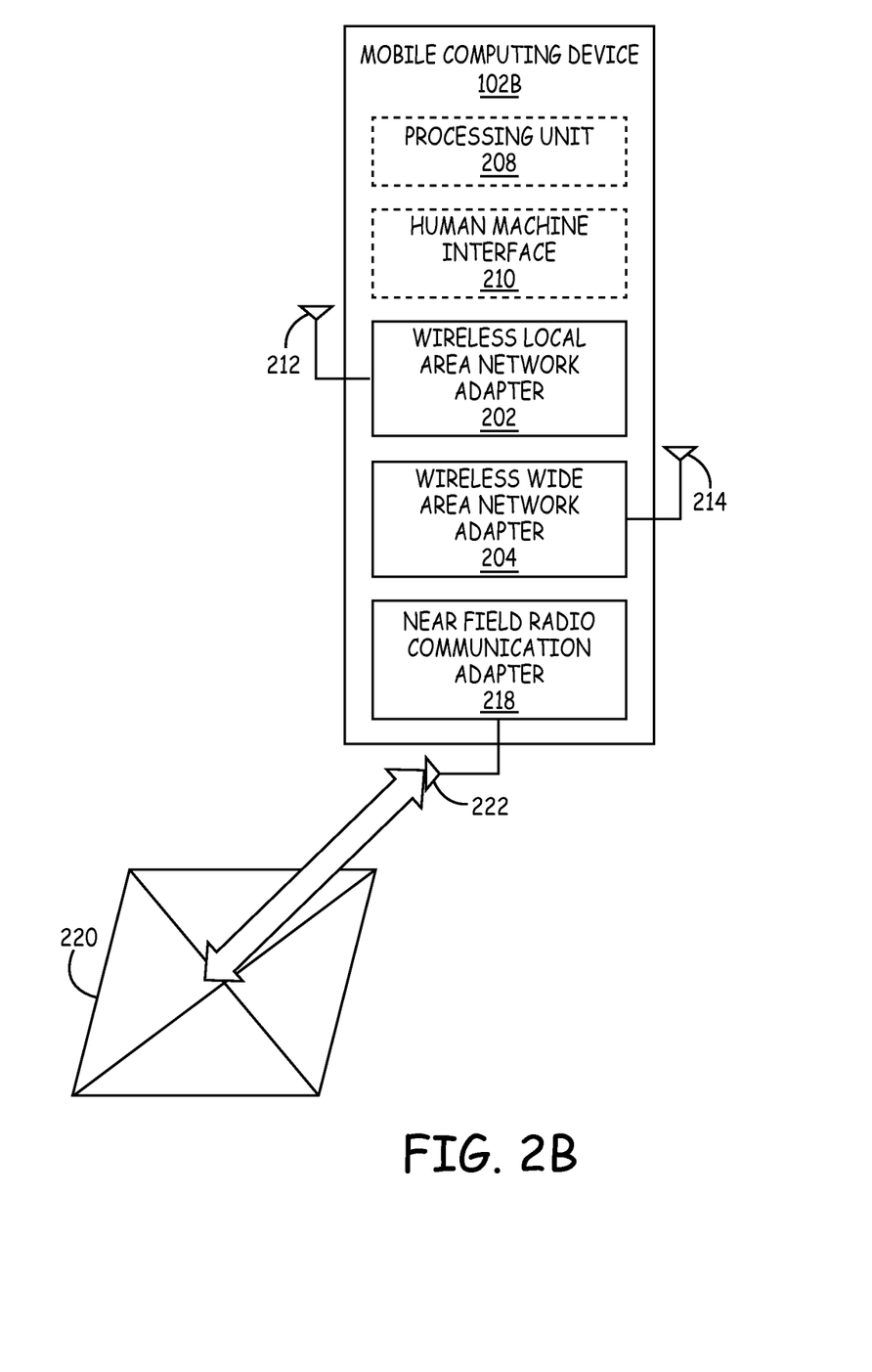

FIGS. 2A-2B are block diagrams depicting exemplary embodiments of mobile computing device 102. Each of FIGS. 2A-2B illustrates a different embodiment of mobile computing device 102, labeled 102A-102B respectively.

FIG. 2A is a block diagram depicting an exemplary embodiment of mobile computing device 102A. Exemplary mobile computing device 102A includes a wireless local area network adapter 202, a wireless wide area network adapter 204, an optical scanner 206, and optional processing unit 208 and optional human machine interface 210.

Wireless local area network adapter 202 is configured to communicate with the wireless hub 104 via the wireless local area network 108 via an antenna 212. Wireless local area network adapter 202 requires security credential to establish a secure wireless network connection with the wireless hub 104. In exemplary embodiments, these credentials are one or more of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

Wireless wide area network adapter 204 is configured to communicate with the remote security credential server 106 via the wireless wide area network 110 via an antenna 214.

Optical scanner 206 is configured to optically scan an optical tag 216. Optical tag 216 includes information regarding the security credentials required to establish the secure wireless network connection between the wireless local area network adapter 202 and the wireless hub 104. In exemplary embodiments, the optical scanner 206 is a color or grayscale camera or an infrared optical code scanner configured to scan and extract the information regarding the security credentials from the patterns on the optical tag 216. In exemplary embodiments, the optical tag 216 may contain other information in addition to the information regarding the security credentials.

In exemplary embodiments, the optical tag 216 is external to the mobile computing device 102A. In exemplary embodiments, the optical tag 216 includes at least one of a barcode, a QR code, a Data Matrix, a Microsoft Tag, a High Capacity Color Barcode, a Cool-Data-Matrix, an Aztec tag, a UPCODE, a Trillcode, a Quickmark, a Shotcode, a mCode, and a Beetagg. In exemplary embodiments, the optical tag 216 is physically attached to a vehicle. In exemplary implementations, the optical tag 216 is physically attached near the operator, driver, pilot, and/or captain's controls for the vehicle. When the operator, driver, pilot, and/or captain enters the vehicle, they can scan the optical tag 216 using the optical scanner 206 to obtain the information regarding the security credentials from the patterns on the optical tag 216.

Mobile computing device 102A is further configured to send the information regarding the security credentials (obtained from scanning the optical tag) across the wireless wide area network 110 to the remote security credential server 106 via the wireless wide area network adapter 204 and the antenna 214. In response, the remote security credential server 106 validates the information regarding the security credentials and then finds the appropriate security credentials and communicates them back across the wireless wide area network 110 for reception by the wireless wide are network adapter 204 of the mobile computing device 102 via the antenna 214.

Mobile computing device 102A is further configured to use the security credentials received from the remote security credential server 106 across the wireless wide area network 110 to establish a secure wireless network connection between the first wireless local area network adapter 202 of the mobile computing device and a second wireless local area network adapter 302 of the wireless hub 104. The second wireless local area network adapter 302 is described in further detail below.

In exemplary embodiments, the first wireless local area network adapter 202 of the mobile computing device 102A is configured to initiate the secure wireless network connection between the first wireless local area network adapter 202 and the second wireless local area network adapter 302 using the security credentials. In exemplary implementations where the security credentials include a particular service set identifier (SSID) or basic service set identifier (BSSID), initiating the secure wireless network connection may include logging onto the wireless hub 104 having the particular service set identifier (SSID) or basic service set identifier (BSSID). In exemplary implementations where the security credentials include a user name, a password, a Pre-Shared Key (PSK), a Wired Equivalent Privacy (WEP) encryption key, a Wi-Fi Protected Access (WPA1/WPA2) password and/or passphrase, a wireless security policy token, a security key, and/or a digital security certificate, initiating the secure wireless network connection may include using the user name, the password, the Pre-Shared Key (PSK), the Wired Equivalent Privacy (WEP) encryption key, the Wi-Fi Protected Access (WPA1/WPA2) password and/or passphrase, the wireless security policy token, the security key, and/or the digital security certificate to logon to the wireless hub 104 requiring this type of security credentials for logon. In exemplary implementations where the security credentials include a media access control address (MAC address) and/or an Internet Protocol (IP) number, initiating the secure wireless network connection may include logging onto the wireless hub 104 having the particular media access control address (MAC address) or Internet Protocol (IP) number.

In exemplary embodiments, the first wireless local area network adapter 202 of the mobile computing device 102A is configured to use the security credentials to enable the second wireless local area network adapter 308 to initiate the secure wireless network connection between the first wireless local area network adapter 202 and the second wireless local area network adapter 302 using the security credentials. In exemplary implementations where the security credentials include a particular service set identifier (SSID) or basic service set identifier (BSSID), using the security credentials to enable the second wireless local area network adapter 308 to initiate the secure wireless network connection may include setting the service set identifier (SSID) or basic service set identifier (BSSID) of the first wireless local area network adapter 202 to be the particular service set identifier (SSID) or basic service set identifier (BSSID) received as the security credentials from the remote security credential server 106. In exemplary implementations where the security credentials include a user name, a password, a Pre-Shared Key (PSK), a Wired Equivalent Privacy (WEP) encryption key, a Wi-Fi Protected Access (WPA1/WPA2) password and/or passphrase, a wireless security policy token, a security key, and/or a digital security certificate, using the security credentials to enable the second wireless local area network adapter 308 to initiate the secure wireless network connection may include setting a required user name, a required password, a required Pre-Shared Key (PSK), a required Wired Equivalent Privacy (WEP) encryption key, a required Wi-Fi Protected Access (WPA1/WPA2) password and/or passphrase, a required wireless security policy token, a required security key, and/or a required digital security certificate to logon to the wireless hub 104 to the user name, the password, the Pre-Shared Key (PSK), the Wired Equivalent Privacy (WEP) encryption key, the Wi-Fi Protected Access (WPA1/WPA2) password and/or passphrase, the wireless security policy token, the security key, and/or the digital security certificate received as the security credentials from the remote security credential server 106. In exemplary implementations where the security credentials include a particular media access control address (MAC address) and/or an Internet Protocol (IP) number, using the security credentials to enable the second wireless local area network adapter 308 to initiate the secure wireless network connection may include setting the media access control address (MAC address) or Internet Protocol (IP) number to be the particular media access control address (MAC address) or Internet Protocol (IP) number.

In exemplary embodiments, the mobile computing device 102 is configured as a gateway between the second wireless local area network adapter 302 of the wireless hub 104 and the wireless wide area network 110. In implementations, this enables the wireless hub 104 to communicate with remote computing devices using the secure local area network 108 connection and the wireless wide area network 110 via the mobile computing device 102.

In exemplary embodiments, optional processing unit 208 includes or functions with software programs, firmware, or other computer readable instructions for carrying out the functionality, methods, process tasks, calculations, and control functions, used in the systems and methods described herein. In exemplary embodiments, optional processing unit 208 includes at least one processing device communicatively coupled to at least one memory. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, the optional human machine interface 210 is used to receive input from a user of the mobile computing device 102A. For example, the optional human machine interface 210 may include any number of switches, buttons, levers, knobs, touch sensitive displays, cameras, microphones, and other sensors to receive input from the user. In exemplary embodiments, the optional human machine interface 210 is used to provide output to the user of the mobile computing device 102A. For example, the optional human machine interface 210 may include any number of displays, projectors, lights, speakers, tactile feedback devices, and other devices to provide output to the user. In exemplary embodiments, the user uses the optional human machine interface 210 to properly acquire an optical image scan of the optical tag 216 by the optical scanner 206.

FIG. 2B is a block diagram depicting an exemplary embodiment of mobile computing device 102B. Exemplary mobile computing device 102B includes the wireless local area network adapter 202, the wireless wide area network adapter 204, a near field radio communication adapter 216, the optional processing unit 208, and the optional human machine interface 210. Mobile computing device 102B includes similar components to mobile computing device 102A described above. The difference between mobile computing device 102B and mobile computing device 102A is that mobile computing device 102B includes the near field radio communication adapter 218 instead of the optical scanner 206 and uses near field radio communication to obtain the information regarding the security credentials from a near field radio communication tag 220.

In exemplary embodiments, near field radio communication adapter 218 is configured to scan the near field radio communication tag 220. Near field radio communication tag 220 includes a memory storing information regarding the security credentials required to establish the secure wireless network connection between the wireless local area network adapter 202 and the wireless hub 104. In exemplary embodiments, the near field radio communication tag 220 may contain other information in addition to the information regarding the security credentials. When the near field radio communication tag 220 is scanned by the near field radio communication adapter 218, the information regarding the security credentials is provided from the memory of the near field radio communication tag 220 to the near field radio communication adapter 218.

In exemplary embodiments, the near field radio communication tag 220 is external to the mobile computing device 102B. In exemplary embodiments, the near field radio communication tag 220 includes at least one of a passive near field communication (NFC) tag, an active near field communication (NFC) tag, a passive radio frequency identification (RFID) tag, an active radio frequency identification (RFID) tag, and a proximity card. In exemplary embodiments, the near field radio communication tag 220 is physically attached to a vehicle. In exemplary implementations, the near field radio communication tag 220 is physically attached near the operator, driver, pilot, and/or captain's controls for the vehicle. When the operator, driver, pilot, and/or captain enters the vehicle, they can scan the near field radio communication tag 220 using the near field radio communication adapter 218 to obtain the information regarding the security credentials stored on the near field radio communication tag 220.

In exemplary embodiments, other than the method of acquisition of the information regarding the security credentials, the mobile computing device 102B otherwise operates according to the description of the mobile computing device 102A above. In exemplary embodiments of mobile computing devices 102, both an optical scanner 206 and a near field radio communication adapter 218 are included enabling acquisition of information regarding the security credentials in either way depending on the presence of optical tags 216 or near field radio communication tags 220.

Figure 3:
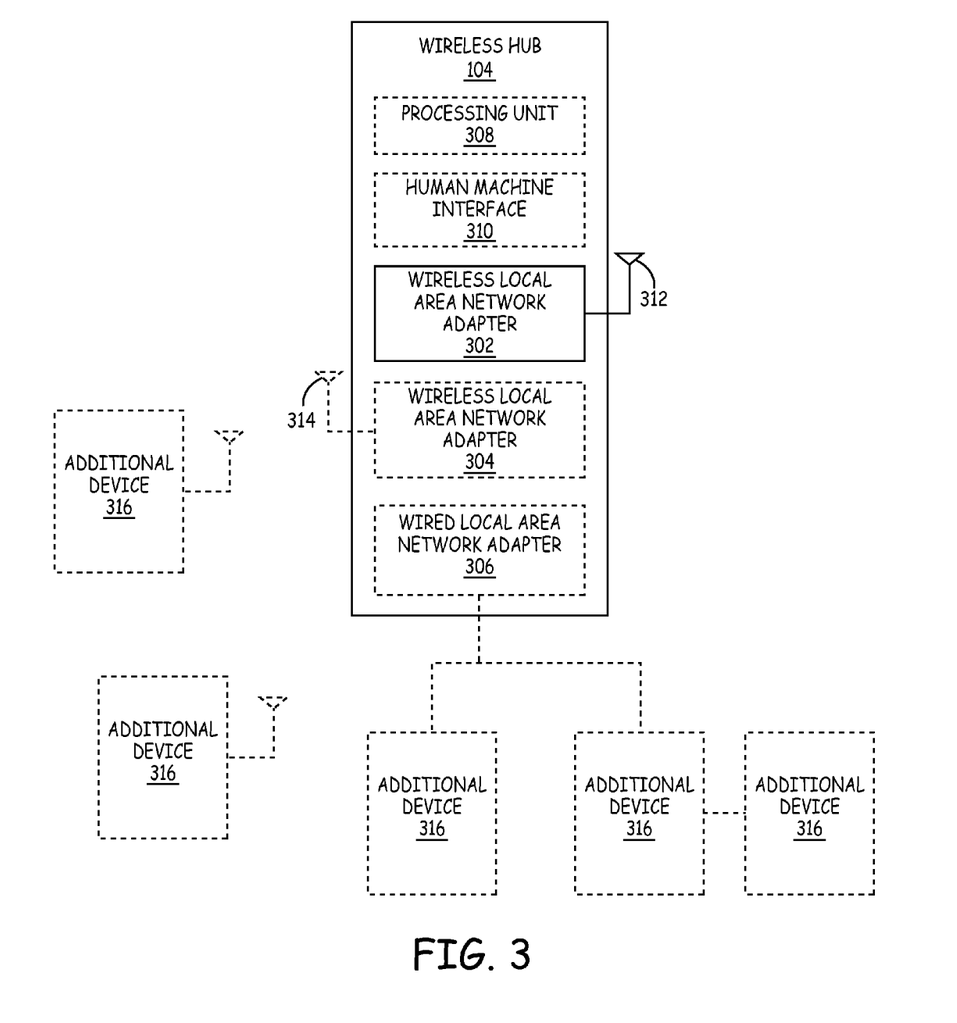
FIG. 3 is a block diagram depicting exemplary embodiments of a wireless hub according to the present disclosure.

FIG. 3 is a block diagram depicting exemplary embodiments of the wireless hub 104. Wireless hub 104 includes a wireless local area network adapter 302, an optional wireless local area network adapter 304, an optional wired local area network adapter 306, an optional processing unit 308, and an optional human machine interface 310.

Wireless local area network adapter 302 is configured to communicate with wireless local area network adapter 202 of the mobile computing device 102 via antenna 312. Wireless local area network adapter 302 requires security credentials to establish a secure wireless network connection with the mobile computing device as described above. In exemplary embodiments, the wireless hub 104 includes security credentials that match the security credentials retrieved by the mobile computing device 102 from the remote security credential server 106. As described above, the mobile computing device 102 is configured to use the security credentials received from the remote security credential server 106 across the wireless wide area network 110 to establish a secure wireless network connection between the first wireless local area network adapter 202 of the mobile computing device and the second wireless local area network adapter 302 of the wireless hub 104.

In exemplary embodiments, the wireless local area network adapter 302 of the wireless hub 104 is configured with the security credentials to enable the wireless local area network adapter 202 of the mobile computing device 102 to initiate the secure wireless network connection between the wireless local area network adapter 202 and the wireless local area network adapter 302 using the security credentials. In exemplary implementations where the security credentials include a particular service set identifier (SSID) or basic service set identifier (BSSID), configuring the wireless local area network adapter with the security credentials to enable the wireless local area network adapter 202 to initiate the secure wireless network connection may include setting the service set identifier (SSID) or basic service set identifier (BSSID) of the wireless local area network adapter 302 to be the particular service set identifier (SSID) or basic service set identifier (BSSID) that will match that received as the security credentials by the mobile computing device 102 from the remote security credential server 106. In exemplary implementations where the security credentials include a user name, a password, a Pre-Shared Key (PSK), a Wired Equivalent Privacy (WEP) encryption key, a Wi-Fi Protected Access (WPA1/WPA2) password and/or passphrase, a wireless security policy token, a security key, and/or a digital security certificate, configuring the wireless local area network adapter with the security credentials to enable the wireless local area network adapter 202 to initiate the secure wireless network connection may include setting a required user name, a required password, a required Pre-Shared Key (PSK), a required Wired Equivalent Privacy (WEP) encryption key, a required Wi-Fi Protected Access (WPA1/WPA2) password and/or passphrase, a required wireless security policy token, a required security key, and/or a required digital security certificate that will match that received as the security credentials by the mobile computing device 102 from the remote security credential server 106. In exemplary implementations where the security credentials include a particular media access control address (MAC address) and/or an Internet Protocol (IP) number, configuring the wireless local area network adapter with the security credentials to enable the wireless local area network adapter 202 to initiate the secure wireless network connection may include setting the media access control address (MAC address) or Internet Protocol (IP) number to be the particular media access control address (MAC address) or Internet Protocol (IP) number that will match that received as the security credentials by the mobile computing device 102 from the remote security credential server 106.

In exemplary embodiments, the wireless local area network adapter 302 of the wireless hub 104 is configured with the security credentials and configured to initiate the secure wireless network connection between the wireless local area network adapter 202 and the wireless local area network adapter 302 using the security credentials. In exemplary implementations where the security credentials include a particular service set identifier (SSID) or basic service set identifier (BSSID), initiating the secure wireless network connection may include logging onto the mobile computing device 102 having the particular service set identifier (SSID) or basic service set identifier (BSSID) that it received as the security credentials by the mobile computing device 102 from the remote security credentials server 106. In exemplary implementations where the security credentials include a user name, a password, a Pre-Shared Key (PSK), a Wired Equivalent Privacy (WEP) encryption key, a Wi-Fi Protected Access (WPA1/WPA2) password and/or passphrase, a wireless security policy token, a security key, and/or a digital security certificate, initiating the secure wireless network connection may include using the user name, the password, the Pre-Shared Key (PSK), the Wired Equivalent Privacy (WEP) encryption key, the Wi-Fi Protected Access (WPA1/WPA2) password and/or passphrase, the wireless security policy token, the security key, and/or the digital security certificate to logon to the mobile computing device 102 requiring matching security credentials that it received from the remote security credential server 106. In exemplary implementations where the security credentials include a media access control address (MAC address) and/or an Internet Protocol (IP) number, initiating the secure wireless network connection may include logging onto the mobile computing device 102 having a matching media access control address (MAC address)

or Internet Protocol (IP) number that it received from the remote security credential server 106.

In exemplary embodiments, optional processing unit 308 includes or functions with software programs, firmware, or other computer readable instructions for carrying out the functionality, methods, process tasks, calculations, and control functions, used in the systems and methods described herein. In exemplary embodiments, optional processing unit 308 includes at least one processing device communicatively coupled to at least one memory. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAM-BUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, the optional human machine interface 310 is used to receive input from a user of the wireless hub 104. For example, the optional human machine interface 104 may include any number of switches, buttons, levers, knobs, touch sensitive displays, cameras, microphones, and other sensors to receive input from the user. In exemplary embodiments, the optional human machine interface 310 is used to provide output to the wireless hub 104. For example, the optional human machine interface 310 may include any number of displays, projectors, lights, speakers, tactile feedback devices, and other devices to provide output to the user.

In exemplary embodiments, the optional wireless local area network adapter 304 and/or the optional wired local area network adapter 306 are configured to communicate with at least one additional device 316. Any combination of wireless or wired devices is possible. In exemplary embodiments, the wireless hub 104 acts as a gateway between the mobile computing device 102 and any additional devices 316 by interfacing between the wireless local area network adapter 302 and the wireless local area network adapter 304 and/or the wired local area network adapter 306. In exemplary embodiments, the wireless local area network adapter 302 and the optional wireless local area network adapter 304 are two instantiations of the same adapter used in two different ways. In exemplary implementations, the wireless local area network adapter 302 is configured to communicate with the at least one additional device 316 in addition to the wireless local area network adapter 202 of the mobile computing device.

Figure 4A:
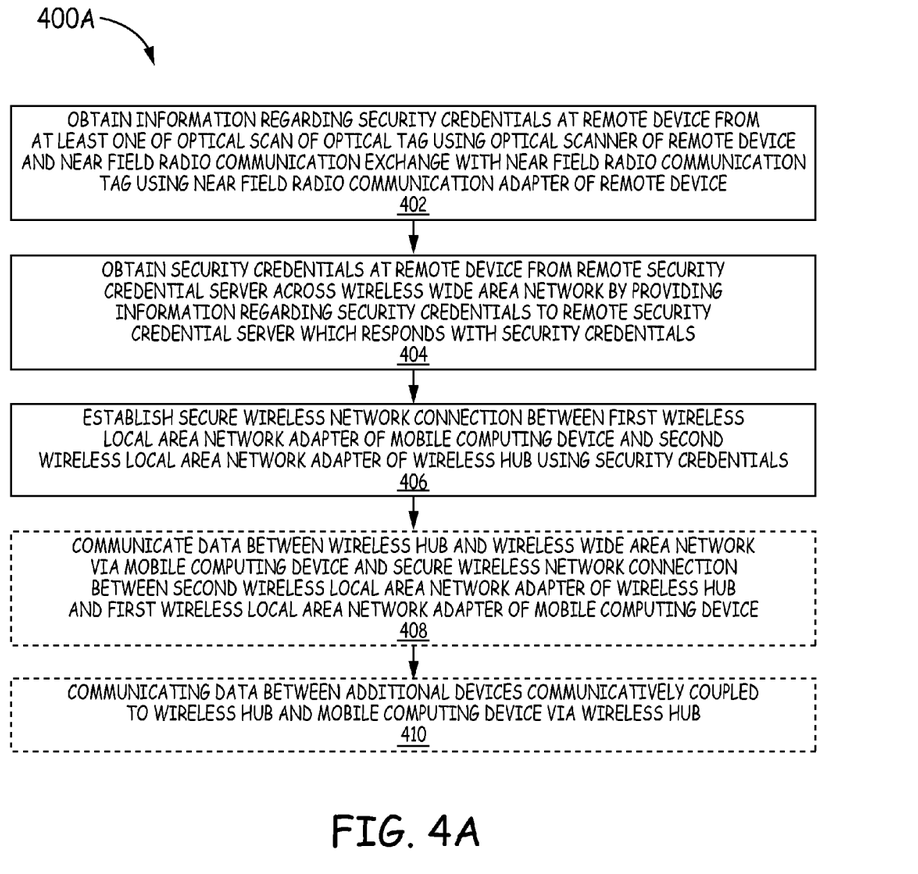
FIGS. 4A-4C are flow diagrams depicting exemplary embodiments of methods according to the present disclosure.
Figure 4B:
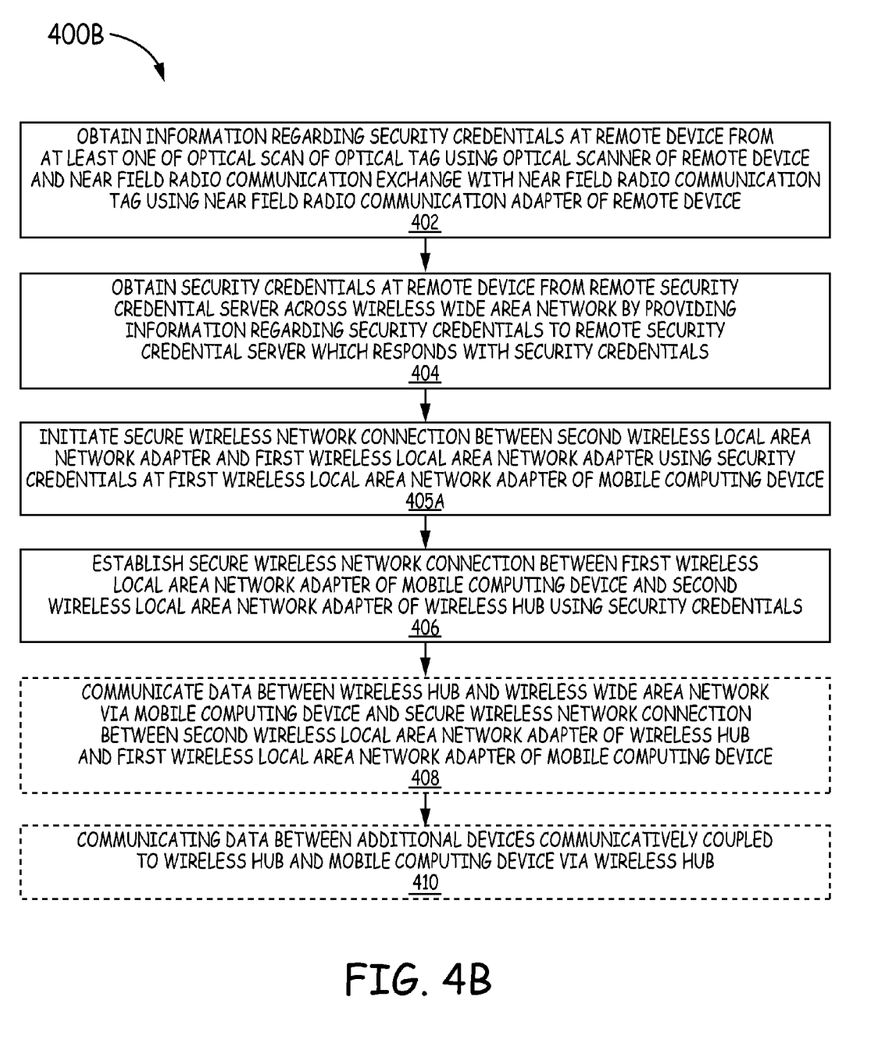
Figure 4C:
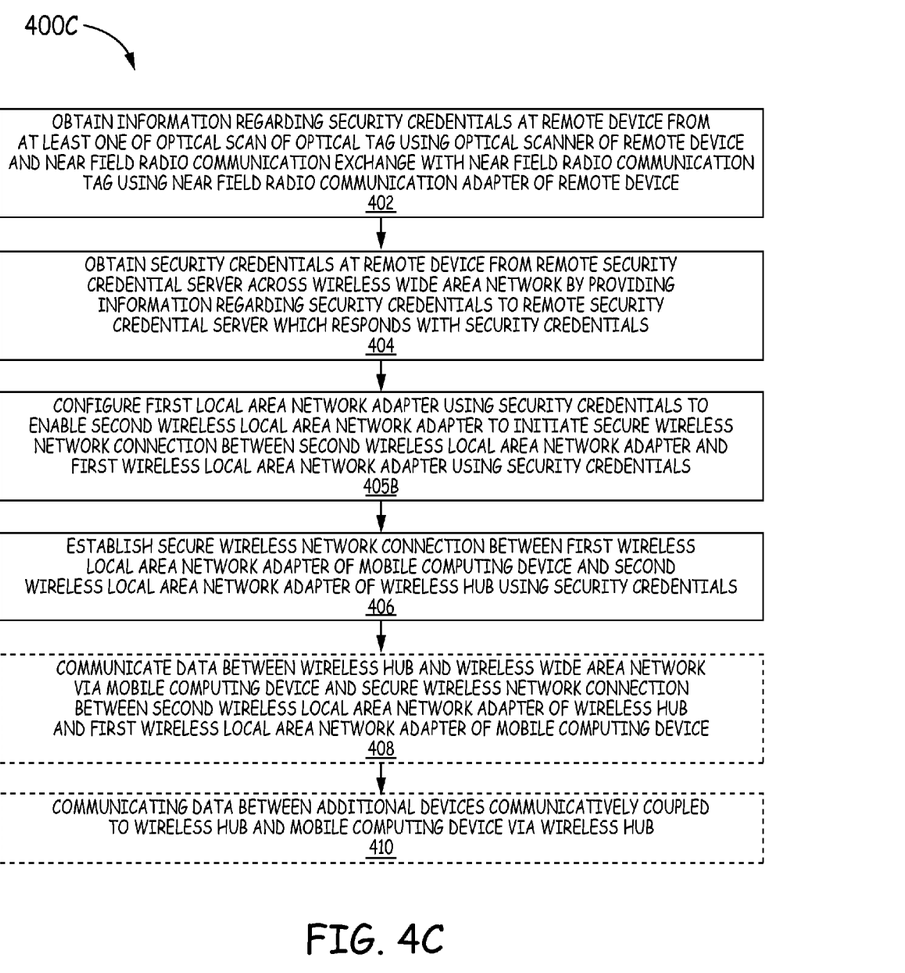

FIGS. 4A-4C are flow diagrams depicting exemplary embodiments of method 400. Each of FIGS. 4A-4C illustrates a different embodiment of method 400, labeled 400A-400C respectively.

Exemplary method 400A begins at block 402 with obtaining information regarding security credentials at a remote device from at least one of an optical scan of an optical tag using an optical scanner of the remote device and a near field radio communication exchange with a near field radio communication tag using a near field radio communication adapter of the remote device.

Exemplary method 400A proceeds to block 404 with obtaining security credentials at the remote device from a remote security credential server across a wireless wide area network by providing the information regarding the security credentials to the remote security credential server which responds with the security credentials.

Exemplary method 400A proceeds to block 406 with establishing a secure wireless network connection between a first wireless local area network adapter of the mobile adapter of the mobile computing device and a second wireless local area network adapter of a wireless hub using the security credentials.

Exemplary method 400A proceeds to optional block 408 with communicating data between the wireless hub and the wireless wide area network via the mobile computing device and the secure wireless network connection between the second wireless local area network adapter of the wireless hub and the first wireless local area network adapter of the mobile computing device. Exemplary method 400A proceeds to optional block 410 with communicating data between additional devices communicatively coupled to the wireless hub and the mobile computing device via the wireless hub.

Exemplary method 400B includes similar blocks to method 400A. The difference between method 400B and method 400A is that method 400B also includes block 405A. At block 405A, the method 400B initiates the secure wireless connection between the second wireless local area network adapter and the first wireless local area network adapter using the security credentials at the first wireless local area network adapter of the mobile computing device.

Exemplary method 400C includes similar blocks to method 400A. The difference between method 400C and 400A is that method 400C also includes block 405B. At block 405B, the method 400C configures the first local area network adapter using the security credentials to enable the second wireless local area network adapter to initiate the secure wireless network connection between the second wireless local area network adapter and the first wireless local area network adapter using the security credentials.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a mobile computing device comprising: a first wireless local area network adapter; a wireless wide area network adapter configured to connect to a remote security credential server across a wireless wide area network; at least one of an optical scanner and a near field radio communication adapter; wherein the mobile computing device is configured to obtain information regarding security credentials from at least one of an optical scan of an optical tag and a near field radio communication exchange with a near field radio communication tag; wherein the mobile computing devices is configured to obtain the security credentials from the remote security credential server across the wireless wide area network by providing the information regarding the security credentials to the remote security credential server which responds with the security credentials; and wherein the mobile computing device is configured to use the security credentials to establish a secure wireless network connection between the first wireless local area network adapter of the mobile computing device and a second wireless local area network adapter of a wireless hub.

Example 2 includes the mobile computing device of Example 1, wherein the first wireless local area network adapter is configured to initiate the secure wireless network connection between the first wireless local area network adapter and the second wireless local area network adapter using the security credentials.

Example 3 includes the mobile computing device of Example 2, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

Example 4 includes the mobile computing device of any of Examples 1-3, wherein the first wireless local area network adapter is configured to use the security credentials to enable the second wireless local area network adapter to initiate the secure wireless network connection between the first wireless local area network adapter and the second wireless local area network adapter using the security credentials.

Example 5 includes the mobile computing device of Example 4, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

Example 6 includes the mobile computing device of any of Examples 1-5, further configured as a gateway between the second wireless local area network adapter of the wireless hub and the wireless wide area network.

Example 7 includes the mobile computing device of Example 6, wherein the wireless hub is configured as a second gateway between the mobile computing device and additional devices communicatively coupled to the wireless hub.

Example 8 includes the mobile computing device of Example 7, wherein at least one of the additional devices communicatively coupled to the wireless hub is communicatively coupled to the wireless hub through at least one of a wireless network and a wired network.

Example 9 includes the mobile computing device of any of Examples 1-8, further configured to obtain the information regarding the security credentials from an optical scan of an optical tag external to the mobile computing device, wherein the optical tag includes at least one of a barcode, a QR Code, a Data Matrix, a Microsoft Tag, a High Capacity Color Barcode, a Cool-Data-Matrix, an Aztec tag, a UPCODE, a Trillcode, a Quickmark, a Shotcode, a mCode, and a Beetagg.

Example 10 includes the mobile computing device of any of Examples 1-9, further configured to obtain the information regarding the security credentials from a near field radio communication exchange with a near field radio communication tag external to the mobile computing device, wherein the near field radio communication tag external to the mobile computing device includes at least one of a passive near field communication (NFC) tag, an active near field communication (NFC) tag, a passive radio frequency identification (RFID) tag, an active radio frequency identification (RFID) tag, and a proximity card.

Example 11 includes the mobile computing device of any of Examples 1-10, wherein the wireless hub is onboard a vehicle.

Example 12 includes the mobile computing device of Example 11, wherein the vehicle comprises at least one of a ground vehicle, a water vehicle, an air-vehicle, and a space vehicle.

Example 13 includes the mobile computing device of any of Examples 11-12, wherein the wireless hub is further configured to provide at least one of diagnostic information, maintenance information, usage information, and logistics information regarding the vehicle to at least one of the mobile computing device via the secure wireless network connection and another computing device through the secure wireless network connection and the wireless wide area network.

Example 14 includes the mobile computing device of any of Examples 1-13, wherein the wireless hub is integrated into at least one of a structure, a container, a pallet, a box, a pipe, a trailer, a vehicle attachment, and a shipping conveyance.

Example 15 includes the mobile computing device of any of Examples 11-14, wherein the wireless hub is further configured to provide information regarding the environmental characteristics or contents of the structure, the container, the pallet, the box, the pipe, the trailer, the vehicle attachment, or the other shipping conveyance to at least one of the mobile computing device via the secure wireless network connection and another computing device through the secure wireless network connection and the wireless wide area network.

Example 16 includes a method comprising: obtaining information regarding security credentials at a remote device from at least one of an optical scan of an optical tag using an optical scanner of the remote device and a near field radio communication exchange with a near field radio communication tag using a near field radio communication adapter of the remote device; obtaining security credentials at the remote device from a remote security credential server across a wireless wide area network by providing the information regarding the security credentials to the remote security credential server which responds with the security credentials; establishing a secure wireless network connection between a first wireless local area network adapter of the mobile computing device and a second wireless local area network adapter of a wireless hub using the security credentials.

Example 17 includes the method of Example 16, further comprising initiating the secure wireless network connection between the second wireless local area network adapter and the first wireless local area network adapter using the security credentials at the first wireless local area network adapter of the mobile computing device.

Example 18 includes the method of Example 17, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

Example 19 includes the method of any of Examples 16-18, further comprising configuring the first local area network adapter using the security credentials to enable the second wireless local area network adapter to initiate the secure wireless network connection between the second wireless local area network adapter and the first wireless local area network adapter using the security credentials.

Example 20 includes the method of Example 19, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

Example 21 includes the method of any of Examples 16-20, further comprising communicating data between the wireless hub and the wireless wide area network via the mobile computing device and the secure wireless network connection between the second wireless local area network adapter of a wireless hub and the first wireless local area network adapter of the mobile computing device.

Example 22 includes the method of Example 21, further comprising communicating data between additional devices communicatively coupled to the wireless hub and the mobile computing device via the wireless hub.

Example 23 includes the method of any of Examples 21-22, wherein obtaining information regarding security credentials at a remote device from at least one of an optical scan of an optical tag using an optical scanner of the remote device and a near field radio communication exchange with a near field radio communication tag using a near field radio communication adapter of the remote device includes obtaining the information regarding the security credentials from an optical scan of an optical tag external to the mobile computing device, wherein the optical tag includes at least one of a barcode, a QR Code, a Data Matrix, a Microsoft Tag, a High Capacity Color Barcode, a Cool-Data-Matrix, an Aztec tag, a UPCODE, a Trillcode, a Quickmark, a Shotcode, a mCode, and a Beetagg.

Example 24 includes the method of any of Examples 21-23, wherein obtaining information regarding security credentials at a remote device from at least one of an optical scan of an optical tag using an optical scanner of the remote device and a near field radio communication exchange with a near field radio communication tag using a near field radio communication adapter of the remote device includes obtaining information regarding the security credentials from a near field radio communication exchange with a near field radio communication tag external to the mobile computing device, wherein the near field radio communication tag external to the mobile computing device includes at least one of a passive near field communication (NFC) tag, an active near field communication (NFC) tag, a passive radio frequency identification (RFID) tag, an active radio frequency identification (RFID) tag, and a proximity card.

Example 25 includes the method of any of Examples 16-24, wherein the wireless hub is onboard a vehicle.

Example 26 includes the method of Example 25, wherein the vehicle comprises at least one of a ground vehicle, a water vehicle, an air-vehicle, and a space vehicle.

Example 27 includes the method of any of Examples 25-26, further comprising: providing at least one of diagnostic information, maintenance information, usage information, and logistics information regarding the vehicle to at least one of the mobile computing device via the secure wireless network connection and another computing device through the secure wireless network connection and the wireless wide area network.

Example 28 includes the method of any of Examples 16-27, wherein the wireless hub is integrated into at least one of a structure, a container, a pallet, a box, a pipe, a trailer, a vehicle attachment, and a shipping conveyance.

Example 29 includes the method of Example 28, further comprising providing information regarding the environmental characteristics or contents of the structure, the container, the pallet, the box, the pipe, the trailer, the vehicle attachment, or the other shipping conveyance to at least one of the mobile computing device via the secure wireless network connection and another computing device through the secure wireless network connection and the wireless wide area network.

Example 30 includes a system comprising: a mobile computing device having a first wireless local area network adapter, a wireless wide area network adapter configured to connect to a remote security credential server across a wireless wide area network, and at least one of an optical scanner and a near field radio communication adapter; a wireless vehicle hub onboard a vehicle, the wireless vehicle hub having a second wireless local area network adapter; wherein the mobile computing device is configured to obtain information regarding security credentials from at least one of an optical scan of an optical tag and a near field radio communication exchange with a near field radio communication tag; wherein the mobile computing device is configured to obtain the security credentials from the remote security credential server across the wireless wide area network by providing the information regarding the security credentials to the remote security credential server which responds with the security credentials; wherein the mobile computing device is configured to use the security credentials to establish a secure wireless network connection between the first wireless local area network adapter of the mobile computing device and the second wireless local area network adapter of the wireless vehicle hub; wherein the mobile computing device is further configured as a gateway between the second wireless local area network adapter of the wireless vehicle hub and the wireless wide area network; and wherein the wireless hub is configured to provide at least one of diagnostic information, maintenance information, usage information, and logistics information regarding the vehicle to at least one of the mobile computing device via the secure wireless network connection and another computing device through the secure wireless network connection and the wireless wide area network.

What is claimed is:
1. A mobile computing device comprising:
   a first wireless local area network adapter configured to connect with a second wireless local area network adapter of a wireless hub across a wireless local area network using security credentials;
   a wireless wide area network adapter configured to connect to a remote security credential server across a wireless wide area network;
   at least one of an optical scanner and a near field radio communication adapter;
   wherein the mobile computing device is configured to obtain information regarding the security credentials from at least one of an optical scan of an optical tag and a near field radio communication exchange with a near field radio communication tag;
   wherein the mobile computing device is configured to provide the information regarding the security credentials to the remote security credential server across the wireless wide area network;
   wherein the remote security credential server is configured to provide the security credentials to the mobile computing device across the wide area network only when the information regarding the security credentials is validated by the remote security credential server; and wherein the mobile computing device is configured to use the security credentials to establish a secure wireless network connection between the first wireless local area network adapter of the mobile computing device and the second wireless local area network adapter of the wireless hub.

2. The mobile computing device of claim 1, wherein the first wireless local area network adapter is configured to initiate the secure wireless network connection between the first wireless local area network adapter and the second wireless local area network adapter using the security credentials.

3. The mobile computing device of claim 2, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

4. The mobile computing device of claim 1, wherein the first wireless local area network adapter is configured to use the security credentials to enable the second wireless local area network adapter to initiate the secure wireless network connection between the first wireless local area network adapter and the second wireless local area network adapter using the security credentials.

5. The mobile computing device of claim 4, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

6. The mobile computing device of claim 1, further configured as a gateway between the second wireless local area network adapter of the wireless hub and the wireless wide area network.

7. The mobile computing device of claim 6, wherein the wireless hub is configured as a second gateway between the mobile computing device and additional devices communicatively coupled to the wireless hub.

8. The mobile computing device of claim 7, wherein at least one of the additional devices communicatively coupled to the wireless hub is communicatively coupled to the wireless hub through at least one of a wireless network and a wired network.

9. The mobile computing device of claim 1, further configured to obtain the information regarding the security credentials from an optical scan of an optical tag external to the mobile computing device, wherein the optical tag includes at least one of a barcode, a QR Code, a Data Matrix, a Microsoft Tag, a High Capacity Color Barcode, a Cool-Data-Matrix, an Aztec tag, a UPCODE, a Trillcode, a Quickmark, a Shotcode, a mCode, and a Beetagg.

10. The mobile computing device of claim 1, further configured to obtain the information regarding the security credentials from a near field radio communication exchange with a near field radio communication tag external to the mobile computing device, wherein the near field radio communication tag external to the mobile computing device includes at least one of a passive near field communication (NFC) tag, an active near field communication (NFC) tag, a passive radio frequency identification (RFID) tag, an active radio frequency identification (RFID) tag, and a proximity card.

11. The mobile computing device of claim 1, wherein the wireless hub is onboard a vehicle.

12. The mobile computing device of claim 11, wherein the vehicle comprises at least one of a ground vehicle, a water vehicle, an air-vehicle, and a space vehicle.

13. The mobile computing device of claim 11, wherein the wireless hub is further configured to provide at least one of diagnostic information, maintenance information, usage information, and logistics information regarding the vehicle to at least one of the mobile computing device via the secure wireless network connection and another computing device through the secure wireless network connection and the wireless wide area network.

14. The mobile computing device of claim 1, wherein the wireless hub is integrated into at least one of a structure, a container, a pallet, a box, a pipe, a trailer, a vehicle attachment, and a shipping conveyance.

15. The mobile computing device of claim 11, wherein the wireless hub is further configured to provide information regarding the environmental characteristics or contents of the structure, the container, the pallet, the box, the pipe, the trailer, the vehicle attachment, or the other shipping conveyance to at least one of the mobile computing device via the secure wireless network connection and another computing device through the secure wireless network connection and the wireless wide area network.

16. A method comprising:
    obtaining information regarding security credentials at a remote device from at least one of an optical scan of an optical tag using an optical scanner of the remote device and a near field radio communication exchange with a near field radio communication tag using a near field radio communication adapter of the remote device;
    providing the information regarding the security credentials from the remote device to a remote security credential server across the wireless wide area networks;
    providing the security credentials from the remote security credential server to the remote device across the wireless wide area network only when the information regarding the security credentials is validated by the remote security credential server; and
    establishing a secure wireless network connection between a first wireless local area network adapter of the mobile computing device and a second wireless local area network adapter of a wireless hub across a wireless local area network using the security credentials.

17. The method of claim 16, further comprising initiating the secure wireless network connection between the second wireless local area network adapter and the first wireless local area network adapter using the security credentials at the first wireless local area network adapter of the mobile computing device.

18. The method of claim 17, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

19. The method of claim 16, further comprising configuring the first local area network adapter using the security credentials to enable the second wireless local area network adapter to initiate the secure wireless network connection between the second wireless local area network adapter and the first wireless local area network adapter using the security credentials.

20. The method of claim 19, wherein the security credentials include at least one of a service set identifier (SSID), a basic service set identifier (BSSID), a user name, a password, a media access control address (MAC address), a Pre-Shared Key (PSK), a Wired Equivalent Privacy (WEP) encryption key, a Wi-Fi Protected Access (WPA) password, a Wi-Fi Protected Access (WPA) passphrase, a wireless security policy token, an Internet Protocol (IP) number, a security key, and a digital security certificate.

21. The method of claim 16, further comprising communicating data between the wireless hub and the wireless wide area network via the mobile computing device and the secure wireless network connection between the second wireless local area network adapter of a wireless hub and the first wireless local area network adapter of the mobile computing device.

22. The method of claim 21, further comprising communicating data between additional devices communicatively coupled to the wireless hub and the mobile computing device via the wireless hub.

23. The method of claim 21, wherein obtaining information regarding security credentials at a remote device from at least one of an optical scan of an optical tag using an optical scanner of the remote device and a near field radio communication exchange with a near field radio communication tag using a near field radio communication adapter of the remote device includes obtaining the information regarding the security credentials from an optical scan of an optical tag external to the mobile computing device, wherein the optical tag includes at least one of a barcode, a QR Code, a Data Matrix, a Microsoft Tag, a High Capacity Color Barcode, a Cool-Data-Matrix, an Aztec tag, a UPCODE, a Trillcode, a Quickmark, a Shotcode, a mCode, and a Beetagg.

24. The method of claim 21, wherein obtaining information regarding security credentials at a remote device from at least one of an optical scan of an optical tag using an optical scanner of the remote device and a near field radio communication exchange with a near field radio communication tag using a near field radio communication adapter of the remote device includes obtaining information regarding the security credentials from a near field radio communication exchange with a near field radio communication tag external to the mobile computing device, wherein the near field radio communication tag external to the mobile computing device includes at least one of a passive near field communication (NFC) tag, an active near field communication (NFC) tag, a passive radio frequency identification (RFID) tag, an active radio frequency identification (RFID) tag, and a proximity card.

25. The method of claim 16, wherein the wireless hub is onboard a vehicle.

26. The method of claim 25, wherein the vehicle comprises at least one of a ground vehicle, a water vehicle, an air-vehicle, and a space vehicle.

27. The method of claim 25, further comprising:
providing at least one of diagnostic information, maintenance information, usage information, and logistics information regarding the vehicle to at least one of the mobile computing device via the secure wireless network connection and another computing device through the secure wireless network connection and the wireless wide area network.

28. The method of claim 16, wherein the wireless hub is integrated into at least one of a structure, a container, a pallet, a box, a pipe, a trailer, a vehicle attachment, and a shipping conveyance.

29. The method of claim 28, further comprising providing information regarding the environmental characteristics or contents of the structure, the container, the pallet, the box, the pipe, the trailer, the vehicle attachment, or the other shipping conveyance to at least one of the mobile computing device via the secure wireless network connection and another computing device through the secure wireless network connection and the wireless wide area network.

30. A system comprising:
a mobile computing device having a first wireless local area network adapter, a wireless wide area network adapter configured to connect to a remote security credential server across a wireless wide area network, and at least one of an optical scanner and a near field radio communication adapter;
a wireless vehicle hub onboard a vehicle, the wireless vehicle hub having a second wireless local area network adapter, wherein the first wireless local area network adapter of the mobile computing device is configured to connect with the second wireless local area network adapter of the wireless vehicle hub across a wireless local area network using security credentials;
wherein the mobile computing device is configured to obtain information regarding security credentials from at least one of an optical scan of an optical tag and a near field radio communication exchange with a near field radio communication tag;
wherein the mobile computing device is configured to provide the information regarding the security credentials to the remote security credential server across the wireless wide area network;
wherein the remote security credential server is configured to provide the security credentials to the mobile computing device only when the information regarding the security credentials is validated by the remote security credential server;
wherein the mobile computing device is configured to use the security credentials to establish a secure wireless network connection between the first wireless local area network adapter of the mobile computing device and the second wireless local area network adapter of the wireless vehicle hub across a wireless local area network;
wherein the mobile computing device is further configured as a gateway between the second wireless local area network adapter of the wireless vehicle hub and the wireless wide area network; and
wherein the wireless hub is configured to provide at least one of diagnostic information, maintenance information, usage information, and logistics information regarding the vehicle to at least one of the mobile computing device via the secure wireless network connection and another computing device through the secure wireless network connection and the wireless wide area network.

* * * * *